(12) United States Patent
Mercat

(10) Patent No.: US 10,730,345 B2
(45) Date of Patent: Aug. 4, 2020

(54) DEVICE FOR FASTENING A CYCLE WHEEL

(71) Applicant: MAVIC S.A.S, Metz-Tessy (FR)

(72) Inventor: Jean-Pierre Mercat, Chavanod (FR)

(73) Assignee: MAVIC S.A.S., Metz-Tessy (FR)

( * ) Notice: Subject to any disclaimer, the term of this patent is extended or adjusted under 35 U.S.C. 154(b) by 271 days.

(21) Appl. No.: 15/977,623

(22) Filed: May 11, 2018

(65) Prior Publication Data

US 2018/0327048 A1 Nov. 15, 2018

(30) Foreign Application Priority Data

May 12, 2017 (FR) ...................................... 17 70487

(51) Int. Cl.
*B60B 27/02* (2006.01)
*B62K 25/02* (2006.01)

(52) U.S. Cl.
CPC ............ *B60B 27/026* (2013.01); *B62K 25/02* (2013.01); *B62K 2206/00* (2013.01)

(58) Field of Classification Search
CPC ...... B60B 27/023; B60B 27/026; B62K 25/02
See application file for complete search history.

(56) References Cited

U.S. PATENT DOCUMENTS

| 5,865,560 | A | 2/1999 | Mercat et al. |
| 7,562,942 | B2 * | 7/2009 | D'Aluisio ............. B60B 1/0223 280/279 |
| 8,075,065 | B2 | 12/2011 | Mercat et al. |
| 9,308,961 | B2 | 4/2016 | McDonald et al. |
| 10,214,263 | B2 * | 2/2019 | Lin ......................... B62K 25/02 |
| 2016/0052588 | A1 | 2/2016 | Walthert et al. |
| 2016/0375950 | A1 | 12/2016 | Mercat |
| 2019/0135035 | A1 * | 5/2019 | Chang ................... B60B 27/026 |

FOREIGN PATENT DOCUMENTS

| EP | 0 810 944 | 12/1997 |
| EP | 2 070 725 | 6/2009 |
| EP | 2 987 713 | 2/2016 |
| FR | 3 037 919 | 12/2016 |
| WO | 2008/145496 | 12/2008 |

OTHER PUBLICATIONS

French Preliminary Search Report in France Patent Application No. FR 17/70487, dated Jan. 24, 2018.

* cited by examiner

*Primary Examiner* — Jason R Bellinger
(74) *Attorney, Agent, or Firm* — Greenblum & Bernstein, P.L.C.

(57) ABSTRACT

Skewer for tightening a cycle wheel to the cycle frame, such skewer including a first end having a threaded portion cooperable with a female thread of a first frame portion, and a second end having axial abutment mechanisms for contacting a second frame portion, as well as drive mechanisms to enable a user to alternately exert a tightening torque or a loosening torque. A torque limiting mechanism operational in the tightening direction is positioned between the drive mechanisms and the rod. The skewer further includes a braking device to increase the torque required to initiate the rotation of the drive mechanisms in the loosening direction. The braking device includes two mutually contacting friction surfaces when the axial abutment mechanisms are in contact with the second frame portion. When the torque limiting mechanism is operational, the braking device becomes non-operational because the friction surfaces are no longer in mutual contact.

12 Claims, 8 Drawing Sheets

DEVICE FOR FASTENING A CYCLE WHEEL

CROSS-REFERENCE TO RELATED APPLICATION

This application is based upon French Patent Application No. FR 17/70487, filed May 12, 2017, the disclosure of which is hereby incorporated by reference thereto in its entirety, and the priority of which is claimed under 35 U.S.C. § 119.

BACKGROUND

1. Field of the Invention

The invention relates to a device for fastening a cycle wheel to the frame of a bicycle. For a number of years, a device referred to as a "quick release" was commonly used to very quickly mount and dismount a cycle wheel. Such a device is described, for example, in the patent document EP 0 810 944 and in counterpart U.S. Pat. No. 5,865,560. In particular, these devices comprise a thin rod (having an outside diameter less than 6.0 mm) that extends through the inside of the hub spindle, and the two ends of which are affixed to abutment elements. These are the abutment elements that come into contact with the rear or front fork ends, the wheel being fastened by decreasing the distance separating the two abutment elements from one another. In general, one of the abutment elements is connected by a screw/nut connection on the rod, whereas the other has a cam mechanism and a lever that makes it possible to quickly change the position of the abutment element relative to the rod. Such a system does not always makes it possible to apportion the tightening force exerted by the user, and a tightening exceeding the thresholds recommended by the wheel or bike manufacturers can generate excessive axial compression of the hub spindle that may negatively affect the mounting of the ball-bearings of the hub by causing either too much axial prestressing on the latter or, conversely, excessive play depending upon the type of bearing mounting used. Furthermore, such a quick tightening system makes no mechanical contribution to the rigidity of the frame or of the fork.

2. Background Information

To solve the problem of exceeding recommended tightening thresholds, it has been envisioned to complete the fastening device with a torque limiting mechanism as disclosed in the patent document EP 2 070 725 and in counterpart U.S. Pat. No. 8,075,065. This device also includes a friction differential interface between the tightening and loosening modes to limit the risk of loosening. However, this interface is of little interest insofar as, in the loosening direction, it is effective only after an angular rotation of a few degrees has occurred in the loosening direction, which is already sufficient to cause an excessive decrease in the tightening force.

So-called skewer systems have been developed, which differ from the devices described above, in particular with respect to the diameter of the rod extending right through the hub. These devices were initially used mainly for bicycles dedicated to sports disciplines such as downhill mountain biking, in which the mechanical stresses of the bicycles are very substantial. Such a device is disclosed in U.S. Pat. No. 9,308,961.

These devices comprise a skewer (having an outer diameter greater than 10 mm), the threaded first end of which is provided to be screwed into one of the rear (or front) fork ends, whereas the other end is equipped with mechanisms for rotational drive of the rod, for example an Allen recess. These devices are certainly stronger, but they have the disadvantage of being slow and do not make it possible to apportion the tightening force unless a torque key is used. However, the user does not always have such a tool.

For safety reasons, and to avoid the risks of loosening the wheel fastening devices, it is recommended that the loosening torque be greater than 70% of the tightening torque. When the device operates with an eccentric, such as in the aforementioned EP 810 944, it is very easy to meet this requirement. Conversely, this is more difficult to achieve when it is a skewer screwed into the frame or the fork. Indeed, given the helix angles of the thread, the friction occurring between the surfaces of the male and female threads is less substantial in the loosening direction than in the tightening direction. In fact, the larger the pitch of the male thread, the greater this difference will be. However, to enable the skewer to be screwed in more quickly, the designer may have to choose a large thread pitch, or double or even multi-threading. This is the reason why the manufacturers of the current screw-in skewers provide additional anti-loosening devices that not only down the skewer but also make its handling more complicated.

SUMMARY

The present invention provides a wheel fastening device that makes it possible to overcome the disadvantages of the prior art. In particular, the invention provides a tightening skewer that can be used without causing any damage to the rolling bearings of the wheel hub.

The invention also provides a tightening skewer that is simple to use while ensuring excellent user safety, for example by preventing any risk of unintended loosening.

Finally, the invention designs a skewer that is lightweight and compact, particularly to improve the aerodynamic performance of a bicycle equipped with such skewers.

To this end, the invention provides for a tightening skewer for fastening a cycle wheel to the frame of a cycle, such skewer including a rod extending along a longitudinal axis and having a central portion framed by two ends, the first of the two ends including a threaded portion adapted to cooperate with a female thread provided in a first portion of the frame of the cycle, the second end being provided with axial abutment mechanisms provided to come into contact with a second portion of the frame of the cycle, as well as drive mechanisms provided to enable a user to alternately exert a tightening torque or a loosening torque, and in which a torque limiting mechanism operational in the tightening direction is positioned between the drive mechanisms and the rod, and in that the skewer further comprises a braking device adapted to increase the torque required to initiate the rotation of the drive mechanisms in the loosening direction.

In a particular non-limiting embodiment, the braking device comprises two friction surfaces that are in contact with one another when the axial abutment mechanisms are in contact with the second frame portion.

In another non-limiting embodiment, the torque limiting mechanism includes two cam rings juxtaposed and movable in relation to one another in translation along the to axis and in rotation along the same axis, and each of the rings comprises cam surfaces for varying the relative axial position of the two rings between a "close together" position and a "spaced apart" position, whereby the rings are more greatly spaced apart in the latter position than in the former position.

In another such non-limiting embodiment, the braking device is positioned between the drive mechanisms and the rod.

In a non-limiting embodiment, the braking device comprises a cylindrical sleeve, a first axial end of which forms the axial abutment mechanisms and a second end of which can come into contact with a surface affixed to the drive mechanisms.

The axial length of the sleeve is such that when the two rings of the torque limiting mechanism are in the "close together" position, the second end of the sleeve is in contact with the surface affixed to the drive mechanisms, whereas, when the two rings are in the "spaced apart" position, the second end of the sleeve is not in contact with this surface.

The torque limiting mechanism can have a trigger value within range of between 3.0 and 20 Nm or, within a range between 6.0 and 12 Nm.

When the user initiates the loosening phase in a particular embodiment, the braking device generates a friction torque that is greater than 5% or, in another embodiment, greater than 10% of the value of the trigger torque of the torque limiting mechanism.

BRIEF DESCRIPTION OF THE DRAWINGS

The invention will be better understood upon reading the description which follows, with reference to the annexed drawings, and in which.

DETAILED DESCRIPTION

Figure 1:
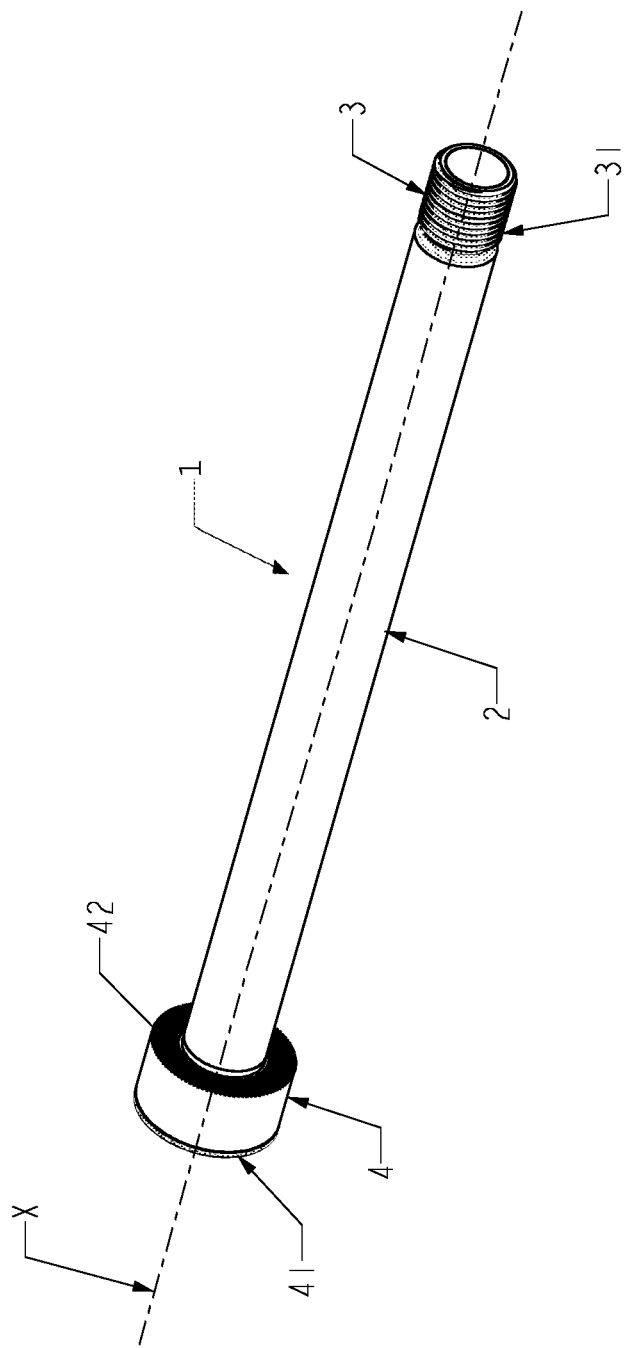
FIG. 1 is a perspective view of the skewer according to the invention.

FIG. 1 shows a perspective view of the skewer 1 for fastening the wheel to the bicycle frame, in particular to the rear fork ends, in the case of a rear wheel, or to the front fork ends, in the case of a front wheel. The skewer comprises a rod 2, having a longitudinal axis X, a first end 3 of which comprises a threaded portion 31 provided to cooperate with a female thread provided in a first rear or front fork end.

The second end 4 comprises drive mechanisms 41 capable of transmitting a torque to the rod 2, and axial abutment mechanisms 42 provided to take support on an outer surface of a second rear or front fork end.

The axial abutment mechanisms 42 are formed by an annular surface oriented along a plane perpendicular to the longitudinal axis. The flatness of the axial abutment mechanisms is a direct consequence of the flatness of the outer surface of the rear or front fork end on which these abutment mechanisms take support. It is in fact also possible to have a conical fit between the axial abutment mechanisms and the surface of the rear or front fork end. The annular surface of the abutment mechanisms 42 is knurled in order to increase the coefficient of friction.

Figure 2:
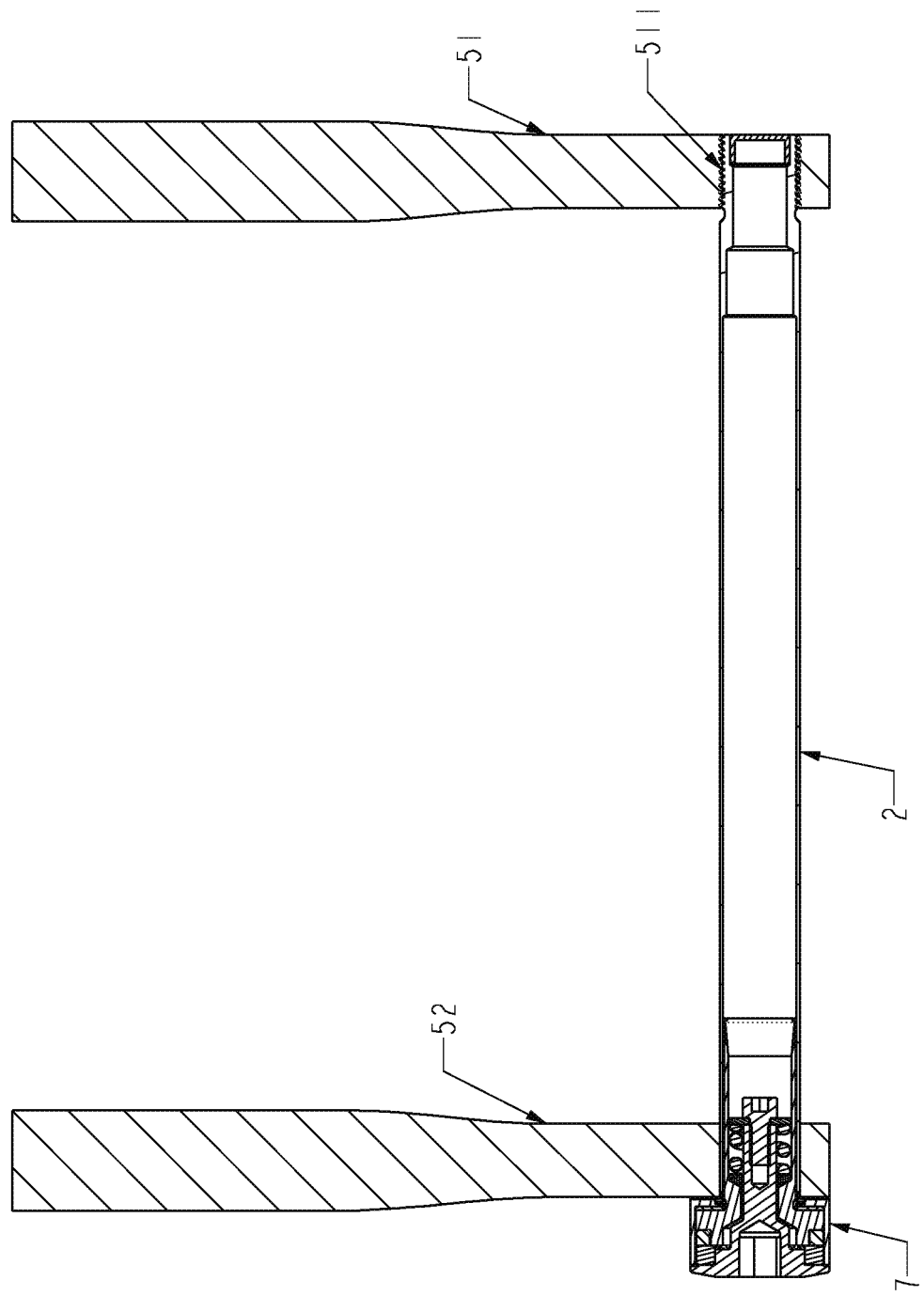
FIG. 2 is a cross-sectional view of the skewer of FIG. 1.

FIG. 2 shows a longitudinal cross-sectional view of the skewer 1 when positioned in a fork. For clarity, the wheel and its hub are not shown. When the wheel is positioned, the central shaft of the hub is located around the skewer 1 and the hub is retained laterally between the two front fork ends 51, 52. The second end of the skewer comprises torque limiting mechanisms 7, which are operational when the drive mechanisms rotate in the tightening direction.

Figure 3:
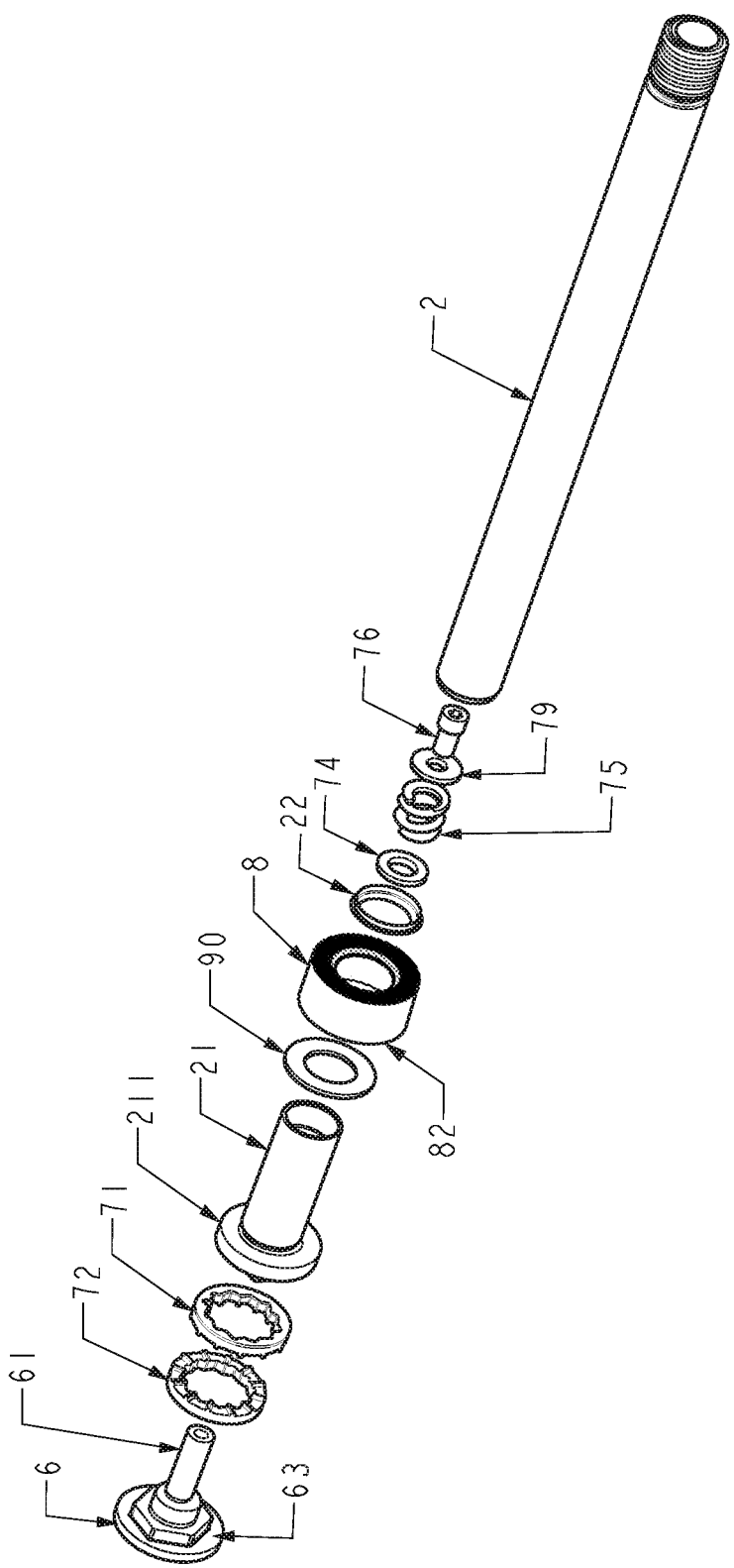
FIG. 3 is an exploded perspective view of the skewer of FIG. 1.
Figure 4:
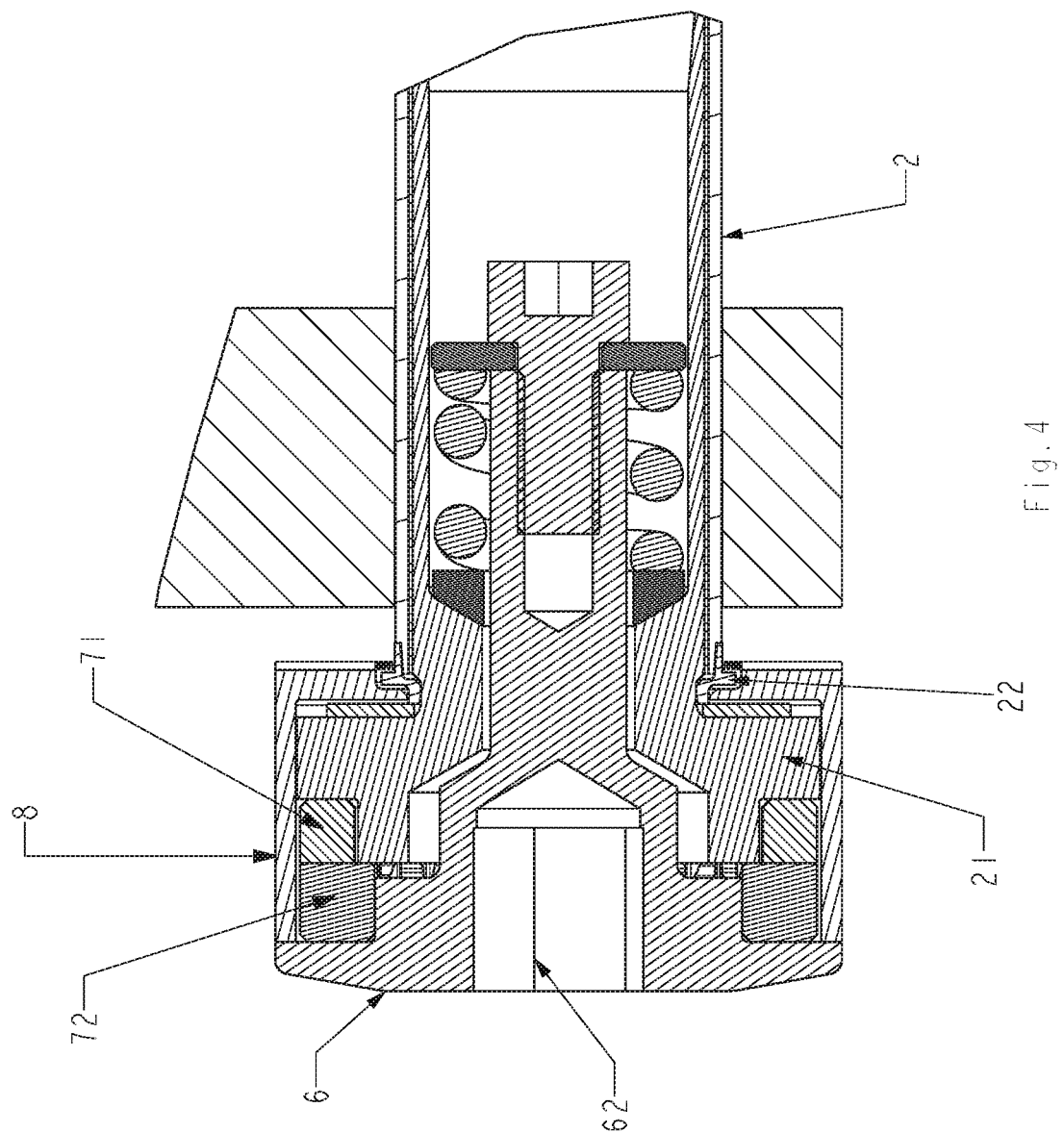
FIG. 4 is a detailed view of the skewer in the free state.

FIG. 3 shows an exploded perspective view of the set of elements forming the second end 4 of the skewer. First, the rod 2 of the skewer is extended by a barrel 21 that is completely affixed thereto. The connection between the rod 2 and the barrel 21 can be achieved by gluing or any other affixation mechanism. A washer 22 extends around the barrel 21, as also indicated in FIG. 4. The end of the barrel 21 comprises a flange 211 having a hexagonal projection on its front surface. This projection is provided to receive a first cam ring 71 via a snap-fit engagement. Thus, the cam ring 71, the barrel 21, and the rod 2 are rotationally affixed to one another.

In the embodiment described here, the drive mechanisms 41 comprise a cap 6 whose outer surface comprises a recess provided to receive an Allen key, and whose inner surface comprises a hexagonal projection. This projection receives a second cam ring 72 affixed rotationally to the cap 6. This construction is not the only one possible in the context of the invention, and these mechanisms can be provided to also comprise an actuating lever eliminating the need for a key to tighten the skewer.

Each of the two cam rings 71 and 72 comprises a central opening having a shape complementary to that of the projections around which they become interlocked. These two rings are also juxtaposed and comprise a series of cams 77 on each of their respective front surfaces facing one another. This double plurality of cams 77 are oriented radially and evenly distributed circumferentially. The cams 77 form a succession of radial ribs 73 projecting from the front surfaces of the rings.

The inner end of the cap 6 comprises a threaded barrel 61 into which is inserted a screw 76 which, via a first supporting washer 79, constitutes an abutment of the spring 75 of the torque limiting mechanism. The spring 75 is further retained by a second supporting washer 74 positioned inside the barrel 21. The spring 75 forces the cap 6 towards the rod/barrel assembly and, therefore, the two cam rings 71 and 72 against one another. These two cam rings 71 and 72 can be identical, though in a non-limiting embodiment, and inverted against one another; they can be easily made by sintering steel powder in order to obtain a part that is precise, economical, having great hardness and very good wear resistance while being self-lubricated, in a non-limiting embodiment, through grease impregnation. In a simplified embodiment, the cam rings are omitted and replaced by positioning earns 77 directly on the cap 6, on the one hand, and on the barrel 21, on the other hand.

A torque limiting mechanism 7 is positioned between the drive mechanisms 41 and the rod 2. The torque limiting mechanism makes it possible to interrupt the drive between the cap and the rod/barrel assembly. This mechanism comprises the two cam rings 71 and 72 and a spring 75. It operates by the cooperation between the cams of the two rings and the constraint exerted by the spring 75. As long as the tightening torque exerted by the user is relatively low, the two rings remain as close to one another as possible, and the cam surfaces of the second cam ring 72 and those of the first ring 71 are in contact. Then the rotation of the cap 6, and the rotation of the second ring 72 which is affixed thereto, causes the rotation of the first ring 71 in the tightening direction. As the first ring 71 is affixed to the barrel 21 and the rod 2, one then proceeds to screw the threaded portion into the front fork end. This relative position of the rings with respect to one another is referred to as the "close together" configuration.

Figure 7:
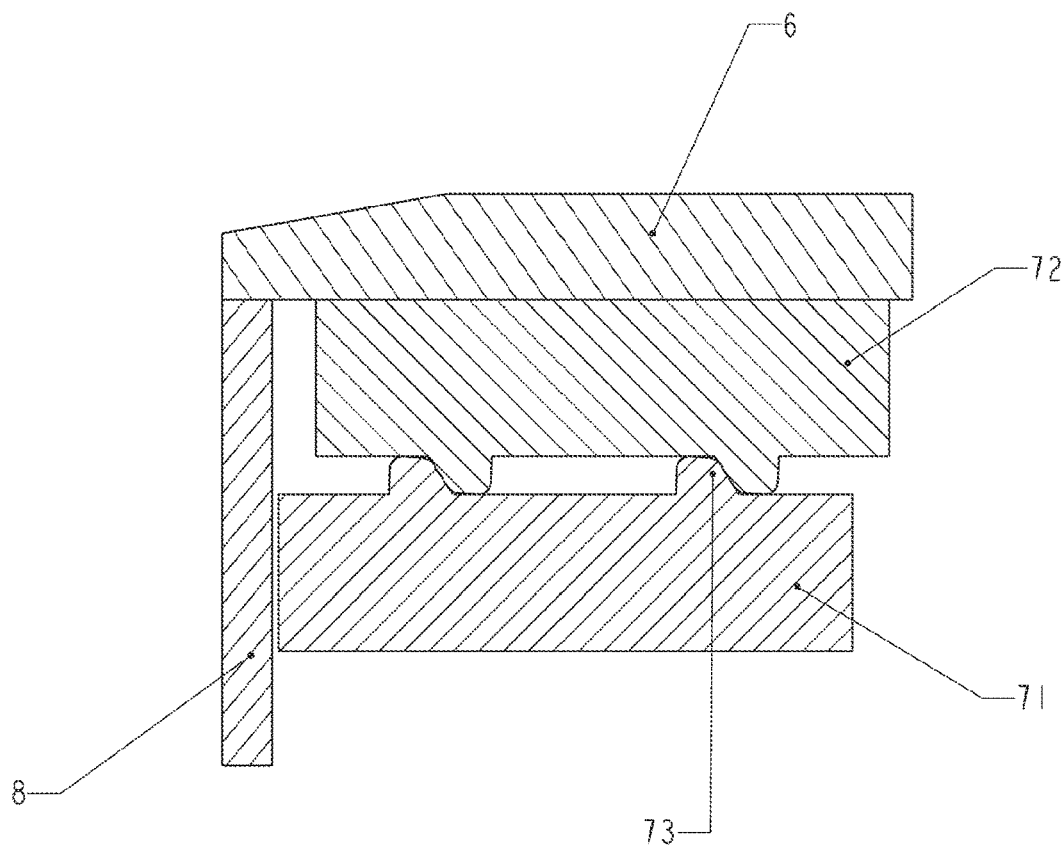
FIGS. 7 to 10 are schematic partial views showing relative positions of the two cam rings.
Figure 8:
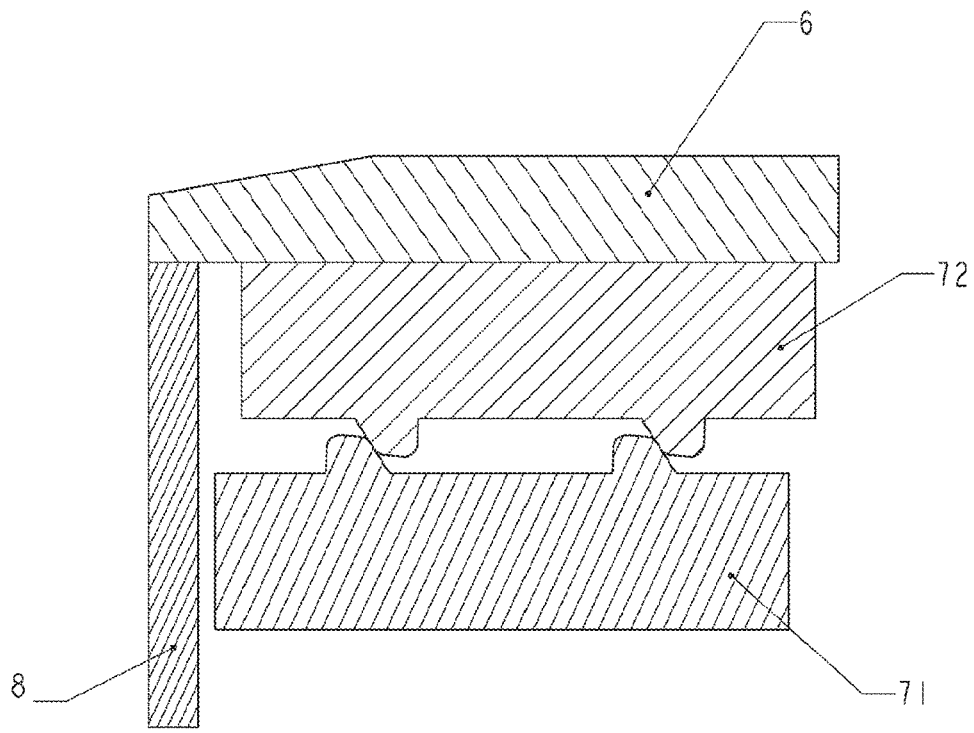
Figure 9:
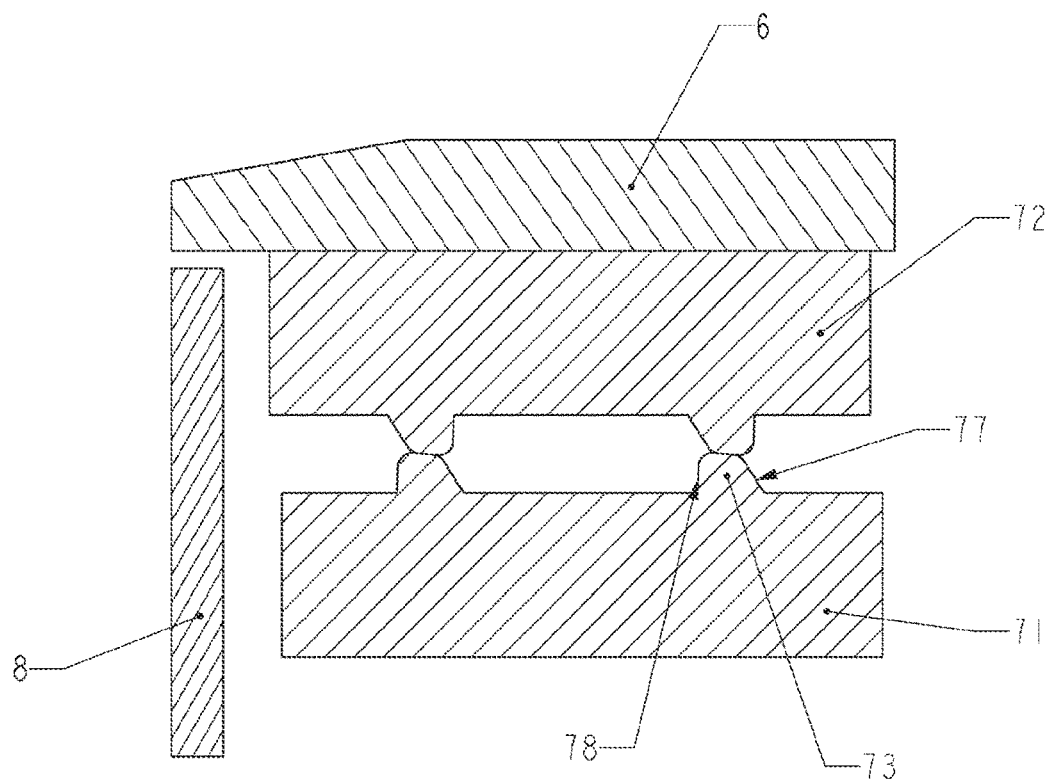
Figure 10:
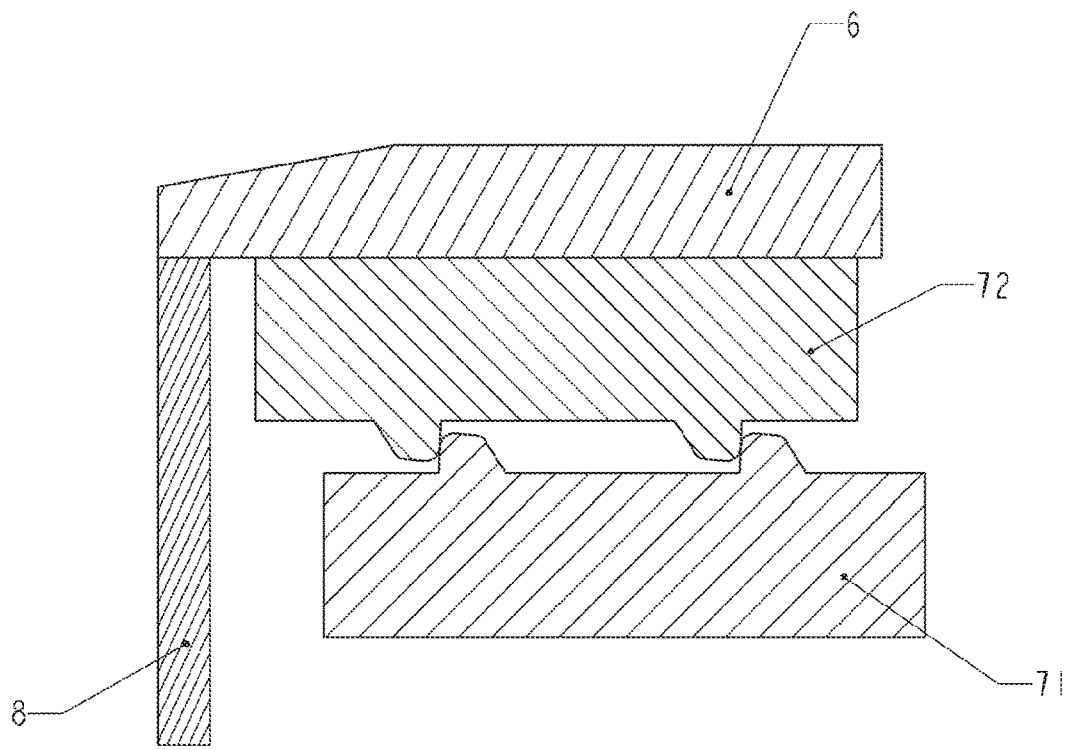

FIG. 7 schematically shows how the two rings 71 and 72 cooperate when the cap 6 is driven in the screwing direction. The view of FIG. 7 as well as the views of FIGS. 8-10 are partial schematic views that are intended to explain the operation of the torque limiting mechanism and of the braking device. The succession of two adjacent ribs 73 of each of the two cam rings 71 and 72 are shown in developed form in these views.

At any moment, the spring 75 forces the cap 6 and the first cam ring 71 into contact with the second cam ring 72. At the beginning of the tightening phase, as shown in FIG. 7, the cam surfaces 77 of the ribs 73 of each of the rings 71 and 72 remain in contact with one another.

Because the cam surfaces in contact have a generally helical shape, an induced axial force is generated when the user transmits a tightening torque through these cams, and as soon as this induced axial force exceeds the prestressing threshold of the spring 75, the two cams slide, thereby causing the rings to be spaced apart. FIG. 8 shows the relative sliding of the cam surfaces against one another. When the distance between the two rings is equal to the height of the ribs that carry the cam surfaces, separation of the rotation occurs between the can and the rod. In other words, the drive of the cap by the key no longer results in a rotation of the rod. Thus, the tightening force is limited. This configuration is shown in FIG. 9.

Conversely, when the user tries to transmit a loosening torque, it is the supporting surfaces 78 opposite the cam surfaces that come into contact with one another, as can be seen in FIG. 10. The supporting surfaces 78 are very steep and do not allow a reversible axial movement, so that the transmission of a loosening torque does not generate any axial force.

The torque limiting mechanism described above is only one of a number of constructional examples for limiting the torque.

The skewer of the invention further comprises a braking device for ensuring a friction differential between tightening and loosening. This braking device mainly comprises a sleeve 8 that is free to rotate in relation to the cap 6, on the one hand, and to the barrel/rod assembly, on the other hand. Its operation is explained below.

FIG. 4 shows a detailed longitudinal cross-sectional view of the second end of the skewer in free position, that is to say, when the skewer is not tightened and, therefore, the axial abutment mechanisms are not in contact with the front fork end. In this configuration, the tightening torque, which is exerted by the user via an Allen key inserted in the recess 62, is relatively low and is directly transmitted to the rod via the second ring 72, then the first ring 71, and then the barrel 21.

The torque exerted then ensures the axial progression of the skewer due to the screw/nut connection existing between the threaded end of the rod 2 and the female thread 511 of the first front fork end 51.

This configuration continues until the axial abutment mechanisms provided on a first axial end 83 of the sleeve 8 come into contact with the second front fork end 52. The rotation of the sleeve is initially braked in order to stop completely. The axial abutment mechanisms comprise a knurled surface so as to increase the coefficient of friction between the sleeve 8 and the second front fork end 52.

As soon as the axial abutment mechanisms are in contact, the device switches to the tightening configuration. Indeed, it is in this tightening configuration that the torque exerted by the user is at least partially converted into a force tightening the hub of the wheel by bringing the two front fork ends closer to one another.

In this tightening configuration, it is important to optimize the efficiency and, therefore, to reduce to a minimum the proportion of exerted torque that dissipates into friction. For this purpose, a sliding washer 90 is provided to be positioned between the flange 211 and the sleeve 8. This sliding washer 90 is for example made of thermoplastic with low coefficient of friction.

To maximize the tightening efficiency, it is also advantageous to reduce the average friction radius of the sliding washer 90 by minimizing its average diameter; its supporting surface must however remain sufficient for the pressure generated by the tightening axial force not to lead to excessive creep of this washer over time.

The effective tightening ends when the torque that must be exerted to continue the rotation of the cap 6 is greater than the predetermined value. This predetermined value is between 3.0 and 20 Nm, for example, and, in certain non-limiting embodiments, between 6.0 and 12 Nm.

Due to the torque limiting mechanism, the cam surfaces that are in contact with one another will slide on one another if too much torque is exerted by the user. A spacing of the rings 71 and 72 then occurs, which, when it reaches its maximum, separates the rotation of the cap 6 from the barrel/rod assembly. Under the effect of relative sliding of the cams relative to one another, the rings switch from the "close together" configuration to the "spaced apart" configuration. During this phase, the spiting 75 is compressed by opposing the displacement of the cams.

Figure 5:
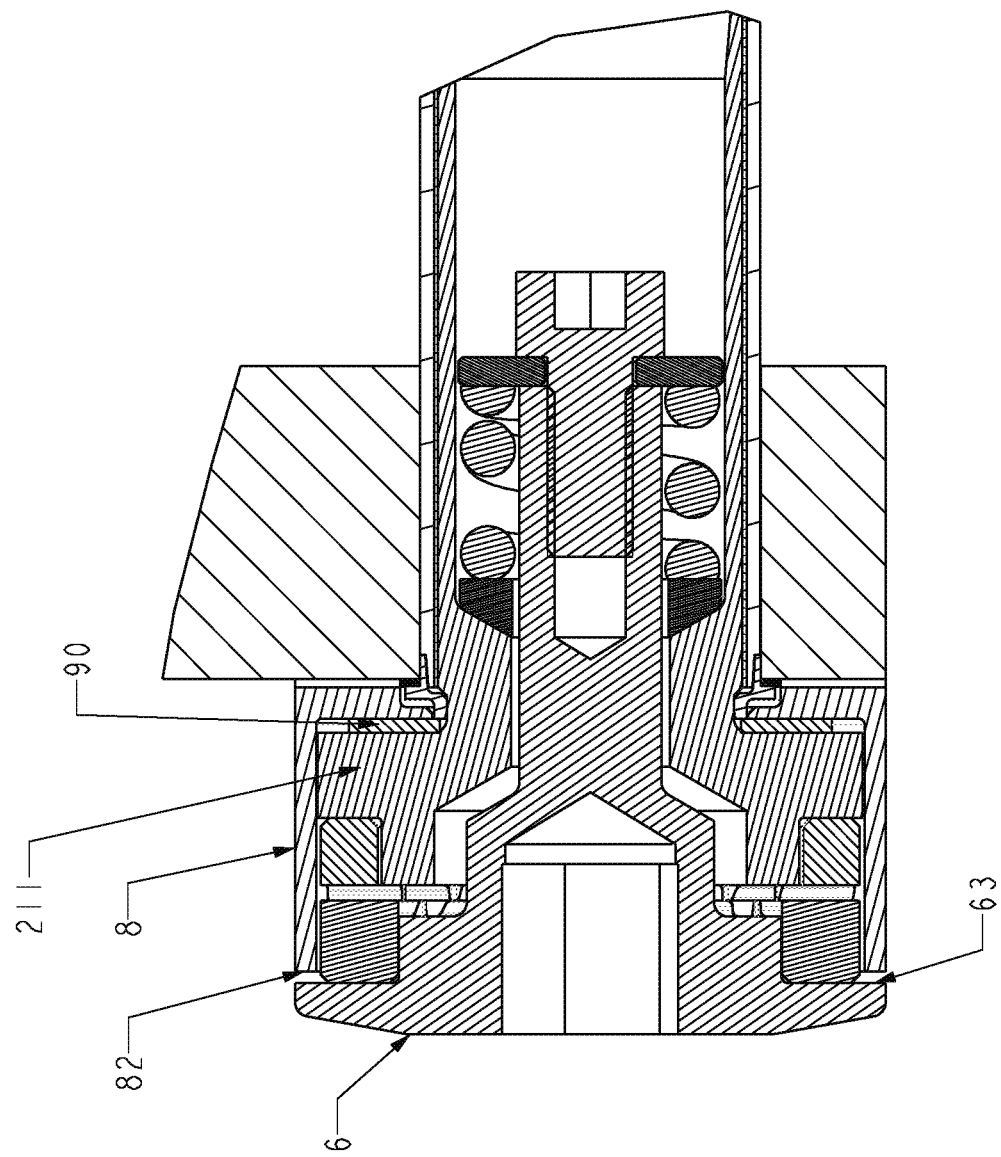
FIG. 5 is a detailed view of the skewer at the end of the tightening operation.

However, as can be seen in FIG. 5, there is no further contact between the rear surface 63 of the cap and the second axial end 82 of the sleeve 8 as soon as the rings 71 and 72 begin to move apart and end up in the "spaced apart" configuration. Thus, in the final moments of the tightening phase, most of the torque exerted by the user is transmitted to the barrel/rod assembly. This makes it possible to improve the efficiency of the device at the end of tightening, that is to say, at the moment when the torque required for tightening reaches its maximum.

Figure 6:
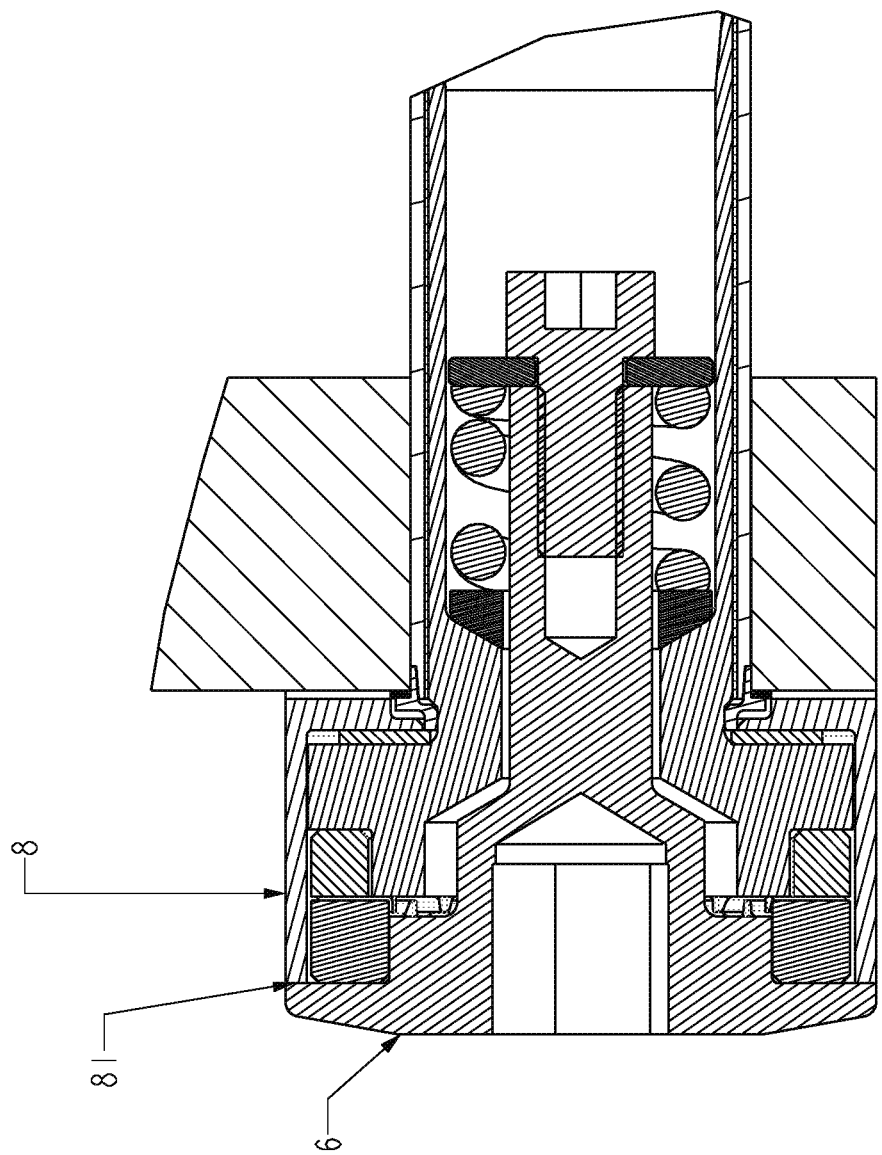
FIG. 6 is a detailed view of the skewer at the beginning of the loosening operation.

FIG. 6 shows the skewer in the tightened configuration, that is to say, in the configuration that it occupies throughout the phase of use of the bicycle by the user, and until the moment when the user wishes to dismount the wheel from the frame.

It is from "tightened" configuration, and as soon as the loosening is initiated, that the braking device 81 becomes operational. As described below, the braking device 81 is intended to increase the torque required to initiate the loosening phase.

The braking device 81 comprises two friction surfaces, including the rear surface 63 of the cap 6 and the second end 82 of the sleeve 6.

When the user initiates the loosening phase by inserting an Allen key into the recess 62, the knurled surface of the sleeve 8 is tightened against the surface of the front fork end. Before the torque exerted by the user can be transmitted to the rod through the two rings, the rings must be in a respective angular configuration that makes it possible. However, given the angular spacing separating the ribs, the relative angular configuration of the rings for a counterclockwise drive (loosening direction) is offset by the same angular spacing in relation to the relative angular configuration allowing a clockwise drive (tightening direction). Therefore, a rotation of the cap 6 is necessary before the torque exerted by the user can be transmitted to the rod 2. In the embodiment described, the angular spacing between two adjacent ribs is 30°, so that, at the beginning of the tightening phase, most of the torque transmitted by the user is consumed by the friction generated between the rear surface 63 of the cap 6 and the second axial end 82 of the sleeve 8.

FIG. 10 shows the relative angular position of the two rings at the end of the initial rotation of the cap in the loosening direction until the supporting surfaces 78 come into contact with one another and the loosening torque exerted by the user is transmitted to the rod 2.

The surface of the second axial end 82 of the sleeve and the rear surface 63 of the cap are processed judiciously so as to maximize the coefficients of friction. The choice of material and surface treatment of the surfaces in contact make it possible to guarantee that the torque required to initiate the loosening is greater than 70%, for example, and, in a non-limiting embodiment, greater than 80% of the tightening torque required for optimal fastening of the wheel.

By way of example, as shown in the figures, the trigger torque of the torque limiting mechanism was calibrated at 8.0 Nm while having a spring 75 calibrated at a force threshold of 500 N (for this purpose, the cams were designed with a mean helix slope of 32.5°). During the loosening phase, the rear surface 63 of the cap 6 must then support this axial force Fa of 500 N, the friction torque T generated exclusively during loosening on this surface, whose mean radius R is 10 mm with a coefficient of friction f of 0.2, is calculated as follows:

$$T = R \cdot Fa \cdot f = 1 \text{ Nm}$$

This additional friction torque here represents 12.5% of the tightening torque, thus substantially increasing the loosening torque/tightening torque ratio by 12.5%, thereby making it much easier to reach the 70% threshold required by the standards, or even the 85% threshold guaranteeing a greater margin of safety.

In the context of the invention, the braking device in non-limiting embodiments, is dimensioned such that the additional friction torque is greater than 5% and, in a particular non-limiting embodiment, greater than 10% of the value of the maximum tightening torque, that is to say, of the trigger torque of the torque limiting mechanism.

Advantageously, the braking device of the invention does not require installing an additional part that could weigh down or increase the size of the end of the skewer. Indeed, the various elements that form it and contribute to its operation, namely the sleeve 8, the cap 6, and the two rings are not exclusively dedicated to it. The sleeve 8, for example, has the primary function to be the outer body of the end 4 of the skewer.

Moreover, the presence of a torque limiting mechanism makes it possible to optimize the weight of the various parts forming the skewer during their mechanical design. This is particularly the case for the rod whose thickness may be minimal insofar as it cannot be subject to excessive torsional stress.

As can be seen in FIG. 9, the braking device is no longer operational when the torque limiting mechanism is operational. Indeed, the torque limiting mechanism is operational when the tightening torque exerted by the user approaches the trigger threshold, which results immediately in spacing the two friction surfaces from one another, and thereby decommissions the braking device.

Without leaving the scope of the invention, a knurling having a fairly fine angular pitch can also be added between the rear surface 63 and the end of the ring 8 in order to increase the additional friction torque during loosening.

Further, at least because the invention is disclosed herein in a manner that enables one to make and use it, by virtue of the disclosure of particular exemplary embodiments, such as for simplicity or efficiency, for example, the invention can be practiced in the absence of any additional element or additional structure that is not specifically disclosed herein.

The invention claimed is:

1. Tightening skewer for fastening a cycle wheel to a cycle frame, said skewer comprising:
   a rod extending along a longitudinal axis, said rod comprising:
      a first end comprising a threaded portion configured to cooperate with a female thread provided in a first portion of the cycle frame;
      a second end provided with axial abutment mechanisms configured to come into contact with a second portion of the frame of the cycle; and
      a central portion extending between the first and second ends;
   drive mechanisms configured to enable a user to alternately exert a tightening torque or a loosening torque;
   a torque limiting mechanism operational in a tightening direction and positioned between the drive mechanisms and the rod; and
   a braking device configured to increase a torque required to initiate rotation of the drive mechanisms in a loosening direction.

2. Tightening skewer according to claim 1, wherein:
   the braking device comprises two friction surfaces that are in contact with one another when the axial abutment mechanisms are in contact with the second frame portion.

3. Tightening skewer according to claim 1, wherein:
   the torque limiting mechanism comprises two cam rings juxtaposed and movable in relation to one another in translation along the longitudinal axis and in rotation along to the longitudinal axis; and
   each of the cam rings comprises cams for varying a relative axial position of the two rings between a "close together" position and a "spaced apart" position.

4. Tightening skewer according to claim 3, wherein:
   the braking device is positioned between the drive mechanisms and the rod.

5. Tightening skewer according to claim 4, wherein:
   the braking device comprises a cylindrical sleeve, said cylindrical sleeve comprising:
      a first axial end constituting said axial abutment mechanisms; and
      a second end configured to come into contact with a surface affixed to the drive mechanisms.

6. Tightening skewer according to claim 5, wherein:
   the axial length of the sleeve is such that:
      when the two cam rings of the torque limiting mechanism are in the "close together" position, the second end of the sleeve is in contact with the surface affixed to the drive mechanisms; and
      when the two cam rings are in the "spaced apart" position, the second end of the sleeve is not in contact with said surface.

7. Tightening skewer according to claim 1, wherein:
the torque limiting mechanism has a trigger value between 3.0 and 20 Nm.

8. Tightening skewer according to claim 1, wherein:
the torque limiting mechanism has a trigger value between 6.0 and 12 Nm.

9. Tightening skewer according to claim 7, wherein:
when the user initiates a loosening phase, the braking device generates a friction torque that is greater than 5% of the value of the trigger torque of the torque limiting mechanism.

10. Tightening skewer according to claim 7, wherein:
when the user initiates a loosening phase, the braking device generates a friction torque that is greater than 10% of the value of the trigger torque of the torque limiting mechanism.

11. Tightening skewer according to claim 8, wherein:
when the user initiates a loosening phase, the braking device generates a friction torque that is greater than 5% of the value of the trigger torque of the torque limiting mechanism.

12. Tightening skewer according to claim 8, wherein:
when the user initiates a loosening phase, the braking device generates a friction torque that is greater than 10% of the value of the trigger torque of the torque limiting mechanism.

* * * * *